US007010534B2

(12) United States Patent
Kraft

(10) Patent No.: US 7,010,534 B2
(45) Date of Patent: Mar. 7, 2006

(54) SYSTEM AND METHOD FOR CONDUCTING ADAPTIVE SEARCH USING A PEER-TO-PEER NETWORK

(75) Inventor: Reiner Kraft, Gilroy, CA (US)

(73) Assignee: International Business Machines Corporation, Armonk, NY (US)

( * ) Notice: Subject to any disclaimer, the term of this patent is extended or adjusted under 35 U.S.C. 154(b) by 448 days.

(21) Appl. No.: 10/298,967

(22) Filed: Nov. 16, 2002

(65) Prior Publication Data

US 2004/0098377 A1 May 20, 2004

(51) Int. Cl.
*G06F 17/30* (2006.01)

(52) U.S. Cl. ............................ 707/10; 707/9; 709/225; 705/26

(58) Field of Classification Search .................... 707/3, 707/9, 10, 104.1; 709/224, 225, 231; 705/26, 705/27

See application file for complete search history.

(56) References Cited

U.S. PATENT DOCUMENTS

| | | | | |
|---|---|---|---|---|
| 6,119,101 A | 9/2000 | Peckover | ..................... | 705/26 |
| 6,125,352 A | 9/2000 | Franklin et al. | .............. | 705/26 |
| 6,134,548 A | 10/2000 | Gottsman et al. | .............. | 707/5 |
| 6,304,854 B1 | 10/2001 | Harris | ......................... | 705/27 |
| 6,760,746 B1 * | 7/2004 | Schneider | ................... | 709/203 |
| 2001/0051901 A1 | 12/2001 | Hager et al. | ................... | 705/26 |
| 2002/0002531 A1 | 1/2002 | Lustig et al. | ................. | 705/37 |
| 2002/0062310 A1 * | 5/2002 | Marmor et al. | ................ | 707/3 |
| 2003/0023505 A1 * | 1/2003 | Eglen et al. | .................. | 705/26 |
| 2003/0050980 A1 * | 3/2003 | Dutta et al. | ................. | 709/205 |
| 2003/0120672 A1 * | 6/2003 | Bingham | .................... | 707/100 |
| 2005/0015466 A1 * | 1/2005 | Tripp | ......................... | 709/219 |

FOREIGN PATENT DOCUMENTS

WO WO01/04778 A2 1/2001

OTHER PUBLICATIONS

"A method for location-based comparison shopping from the click-and brick stores," Research Disclosure, Sep. 2001.

"Distributed Data on Demand, Accessing and Enabling Distributed Data in Real-Time," 2001.

(Continued)

*Primary Examiner*—Leslie Wong
(74) *Attorney, Agent, or Firm*—Samuel A. Kassatly

(57) ABSTRACT

A distributed comparison shopping system is based on a decentralized, distributed architecture utilizing a peer-to-peer network. The system creates an active marketplace with real-time price comparisons, with the peer-to-peer nodes coordinating connectivity with other peers and building a dynamic network. Each message includes a fixed component and an adaptive update component. The adaptive update component contains search criteria and search status fields that are selectively modified as the message travels through the peer-peer network. A node that receives a message will interpret the search criteria and apply those criteria to a local search result. The node then either forwards the unmodified or the modified message to other nodes in its neighborhood, or, alternatively, requests an authorization to modify the message prior to rebroadcasting, from the source node.

34 Claims, 7 Drawing Sheets

OTHER PUBLICATIONS

"Technology Description, The ExactOne Infrastructure: Accessing and Enabling Distributed Data in Real-Time," 2001.

M. Chung et al., "A Negotiation Model in Agent-Mediated Electronic Commerce," Multimedia Software Engineering, Proceedings, International Symposium, 2000.

S. Loureiro et al., "Secure Data Collection With Updates," Electronic Commerce Research, vol. 1, No. 1-2, pp 119-130, 2001.

R. Doorenbos et al., "A Scalable Comparison-Shopping Agent for the World-Wide Web," Technical Report UW-CSE-96-01-03, In Proc. of the First Int'l Conf. on Autonomous Agents, pp. 39-48, Feb. 1997.

* cited by examiner

SYSTEM AND METHOD FOR CONDUCTING ADAPTIVE SEARCH USING A PEER-TO-PEER NETWORK

FIELD OF THE INVENTION

The present invention generally relates to the field of electronic commerce (or e-commerce) over a network such as a peer-to-peer network. More particularly, this invention pertains to a system and associated method for creating an active marketplace with real-time price comparisons within the peer-to-peer network. Specifically, this invention provides a mechanism whereby messages from nodes in the peer-to-peer network can be adaptively modified (or updated), returned to the originator, and transmitted to other nodes in the network.

BACKGROUND OF THE INVENTION

The World Wide Web (WWW or the Web) is comprised of an expansive network of interconnected computers upon which businesses, governments, groups, and individuals throughout the world maintain inter-linked computer files known as web pages. Shoppers navigate these pages by means of computer software programs commonly known as Internet browsers. Due to the vast number of WWW sites, many web pages have a redundancy of information or share a strong likeness in either function or title. The vastness of the unstructured WWW causes shoppers to rely primarily on Internet search engines to retrieve information or to locate businesses. These search engines use various means to determine the relevance of a shopper-defined search to the information retrieved.

The authors of web pages provide information known as metadata within the body of the hypertext markup language (HTML) document that defines the web pages. A computer software product known as a web crawler systematically accesses web pages by sequentially following hypertext links from page to page. The crawler indexes the pages for use by the search engines from information about a web page as provided by its address or Universal Resource Locator (URL), metadata, and other criteria found within the page. The crawler is run periodically to update previously stored data and to append information about newly created web pages. The information compiled by the crawler is stored in a metadata repository or database. The search engines search this repository to identify matches for the shopper-defined search rather than attempt to find matches in real time.

A typical search engine has an interface with a search window where the shopper enters an alphanumeric search expression or keywords. The search engine sifts through available web sites for the shopper's search terms, and returns the results of the search in the form of HTML pages. Each search result includes a list of individual entries that have been identified by the search engine as satisfying the shopper's search expression. Each entry or "hit" may include a hyperlink that points to a Uniform Resource Locator (URL) location or web page.

Electronic shopping (or e-shopping) has been gaining popularity on the WWW. An outgrowth of the popularity of Internet or on-line shopping is the advent of on-line comparison shopping engines. Price comparison tools, often promoted by Web portals such as Yahoo!®, AltaVista®, Shopping.com®, or shopping services such as Bluefly® or MySimon.com®, are essentially web search engines that allow a user to search a population of web merchants for the lowest price for a desired item.

These search engines allow a shopper to enter a key word that is usually a description of the desired item. In response to the shopper's query, the search engines return a set of corresponding Web-based matches listing the merchants or merchant's Web sites that offer the desired item.

Typically, the user must undertake these searches on an item-by-item basis. The search is performed against a set of retailers determined by the search engine owner. The population of merchants searched may be open-ended as in the case of search engines that use agents or "bots" to scan the Web for such items or closed as in search engines that search only across a group of subscribed merchants.

To create a database of items and their prices, the price crawlers typically go to each merchant's web site, extract the price information from that web site, and create a database of items, prices, and other supporting information. However, it is difficult to acquire the price data from the merchant's web site. Technologies exist that prevent a price crawler or other such other service from extracting any information from a Web site.

Price information obtained over the Web can be incomplete, inaccurate, or out of date. In addition, the centralized approach for price comparison used by current price comparison web sites could be unduly manipulated by merchants. In addition, current comparison shopping solutions rely on price crawlers capturing information from the merchant. There is currently no mechanism for allowing merchants and customers to interact in a marketplace format, in that the current comparison shopping solutions available to the customers are limited.

What is therefore needed is a system and associated method for direct communication between buyer and sellers, allowing a free marketplace interaction. The need for such a system and method has heretofore remained unsatisfied.

SUMMARY OF THE INVENTION

The present invention satisfies this need, and presents a system, a computer program product, and an associated method (collectively referred to herein as "the system" or "the present system") for conducting an adaptive search using a peer-to-peer network. In a preferred embodiment, the present system uses a peer-to-peer network to conduct distributed comparison shopping. The present system is based on a decentralized, distributed architecture utilizing a peer-to-peer network, creating an active marketplace with real-time price (features or criteria) comparisons. Standard peer-to-peer infrastructures such as Gnutella, Freenet, or Sun Microsystems JXTA® can be used to implement the present system.

Sellers either enter price information for products or services in a graphical user interface with electronic forms or use a gateway to provide access to an existing product/price database. The peer-to-peer node coordinates connectivity with other peers, building a dynamic network. A user/buyer can enter specific search requests using complex search criteria based on XML. Each node on the peer-to-peer network can participate simultaneously in selling and buying activities. The seller's request is broadcast from node to node by the peer-to-peer network.

The present system uses an adaptive search approach. A starting node is the origination of the search request. Messages are described, for exemplification purpose, in XML, using "channels," e.g., using XML namespaces.

Each message can include, for example, a subject component (or section) and an adaptive update component (or section). In one embodiment, the subject component is preferably fixed by the user and does not change. The subject component can include an identifier, such as a product or service identification that uniquely identifies the product or service of interest.

The adaptive update component can be adaptively changed, either in part or in whole as the message propagates or travels through the network. In a preferred embodiment, the adaptive update component can be comprised of any one or more of a search criterion (or criteria), a search status field (or fields). It should be clear that the message may also contain other fields or information of interest to the user and/or merchants, and required by the network.

An aspect of the present system is that the adaptive update component of the message changes (or is updated) while traveling in the peer-to-peer network. Nodes that receive a search request will interpret the search criteria and apply those criteria to a local search result. If no results are found by the node, the node stops the search, and forwards the message, unchanged, to the next node or nodes in the peer-to-peer network.

Otherwise, if one or more search criteria are found by the node, the node can take, for example, one of two actions, as determined by the user and set as instructions in the message. According to a first embodiment, the node updates the adaptive update component of the message, resulting in a modified message. The node then forwards the modified message to the next node or nodes in the peer-to-peer network. For example, the merchant responds to the buyer with a lower price or better shipping terms. This new information is encoded in the original search request, which reflects that the dynamically changing nature of the adaptive search.

According to a second embodiment, the node returns the response back to the source or originating node, requesting confirmation or authorization request to update the message. If the authorization request is approved by the source node, the node forwards the updated message to the next node or nodes in the peer-to-peer network.

As an example, if the local found result is "better" in some aspect than the current criterion (or criteria), such as price, of the original message, the node contacts the originating node and sends a request to modify the original message. The modified message request contains, for example, the following information:

The message type (modified);

the original message the node received;

the condition on which the node is offering the product (price, shipping, etc.); and virtual or physical location/address of the product or service.

Additional optimizations for query routing are possible. The use of channels for communication between nodes provides rich expressiveness in queries because the underlying format is XML. Digital signatures may be used to verify data integrity properties.

The present system provides a marketplace for merchants and customers that does not require price crawlers. Because the connection between merchant and customer is "real time," the information provided to the customer is current. The present system has unlimited scalability; millions of nodes can be supported concurrently. Users can buy and sell products or services simultaneously. The present system is readily integrated into the existing Internet infrastructure.

For example, a user other than a merchant wishes to sell an item such as a book. The user chooses a shopping channel. Once the information is entered, it is available for the adaptive search of the present invention. A merchant may provide products or services by providing a gateway to their legacy product database. This makes the information in the database available to the peer-to-peer network. The gateway performs the transcoding work required to communicate with other nodes in the network.

To purchase a product, such as a book, the user enters a specific search request within a graphical user interface using a "book channel." The present system searches for the lowest available price for that item by transmitting the request to its neighborhood nodes on the peer-to-peer network. The nodes that wish to respond return the request with their offer and a URL to the product site.

BRIEF DESCRIPTION OF THE DRAWINGS

The various features of the present invention and the manner of attaining them will be described in greater detail with reference to the following description, claims, and drawings, wherein reference numerals are reused, where appropriate, to indicate a correspondence between the referenced items, and wherein:

DETAILED DESCRIPTION OF PREFERRED EMBODIMENTS

The following definitions and explanations provide background information pertaining to the technical field of the present invention, and are intended to facilitate the understanding of the present invention without limiting its scope:

Channel: Communications category within the peer-to-peer network. Nodes can form their own channels that they then broadcast to other nodes. These other nodes might or might not adopt this new channel.

Node: A processing location in a network. In a peer-to-peer networks, a node can be a computer, server, or a gateway.

Peer-to-peer Architecture: A type of network in which each workstation has equivalent capabilities and responsibilities. This differs from client/server architectures, in which some computers are dedicated to serving the others. Peer-to-peer networks are generally simpler, but they usually do not offer the same performance under heavy loads.

XML: eXtensible Markup Language. A standard format used to describe semi-structured documents and data. During a document authoring stage, XML "tags" are embedded within the informational content of the document. When the XML document is subsequently transmitted between computer systems, the tags are used to parse and interpret the document by the receiving system.

Figure 1:
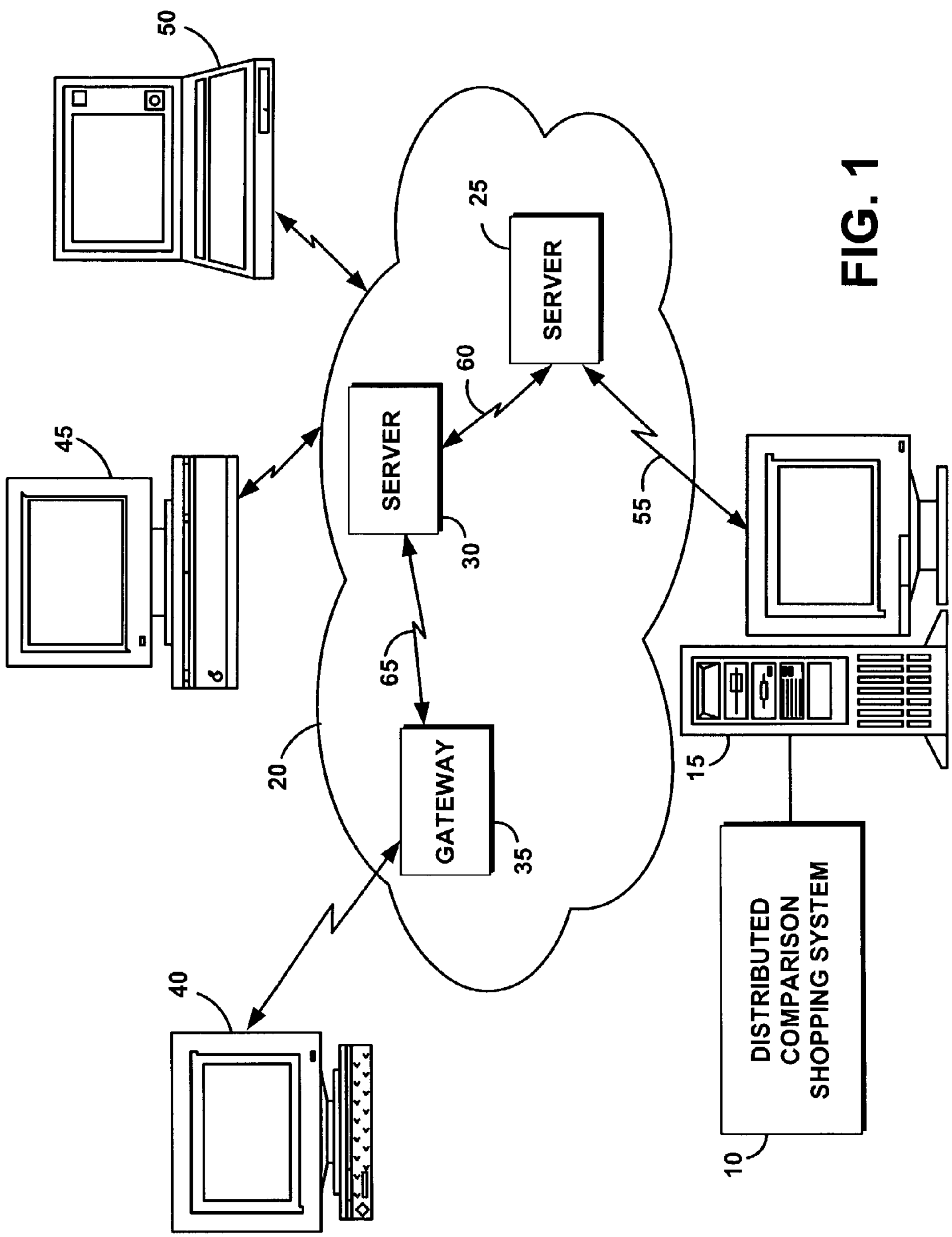
FIG. 1 is a schematic illustration of an exemplary operating environment in which a distributed comparison shopping system of the present invention can be used.

FIG. 1 portrays an exemplary overall environment in which a system 10 and associated method for conducting distributed comparison shopping using a peer-to-peer network according to the present invention may be used. System 10 includes a software programming code or computer program product that is typically embedded within, or installed on a host server 15. Alternatively, system 10 can be saved on a suitable storage medium such as a diskette, a CD, a hard drive, or like devices. While the system 10 will be described in connection with the WWW, the system 10 can be used with a stand-alone database of terms that may have been derived from the WWW and/or other sources.

The cloud-like peer-to-peer network 20 is comprised of communication lines and switches connecting servers such as servers 25, 30, to gateways such as gateway 35. The servers 25, 30 and the gateway 35 provide the communication access to the WWW or Internet. Users, such as remote Internet users, are represented by a variety of computers such as computers 40, 45, 50, and can query the host server 15 for desired information through the peer-to-peer network 20. Computers 40, 45, 50 each include software that will allow the user to browse the Internet and interface securely with the host server 15.

The host server 15 is connected to the peer-to-peer network 20 via a communications link 55 such as a telephone, cable, or satellite link. The servers 25, 30 can be connected via high-speed Internet network lines 60, 65 to other computers and gateways. System 10 could use the Internet for communication between computers and servers. Rather than using a server-client approach as used in the Internet, the peer-to-peer network 20 uses nodes. Each node can operate either as a server or as a client, publishing or receiving information. The host server 15 and computers 40, 45, 50 can be viewed as nodes in the peer-to-peer network 20.

Figure 2:
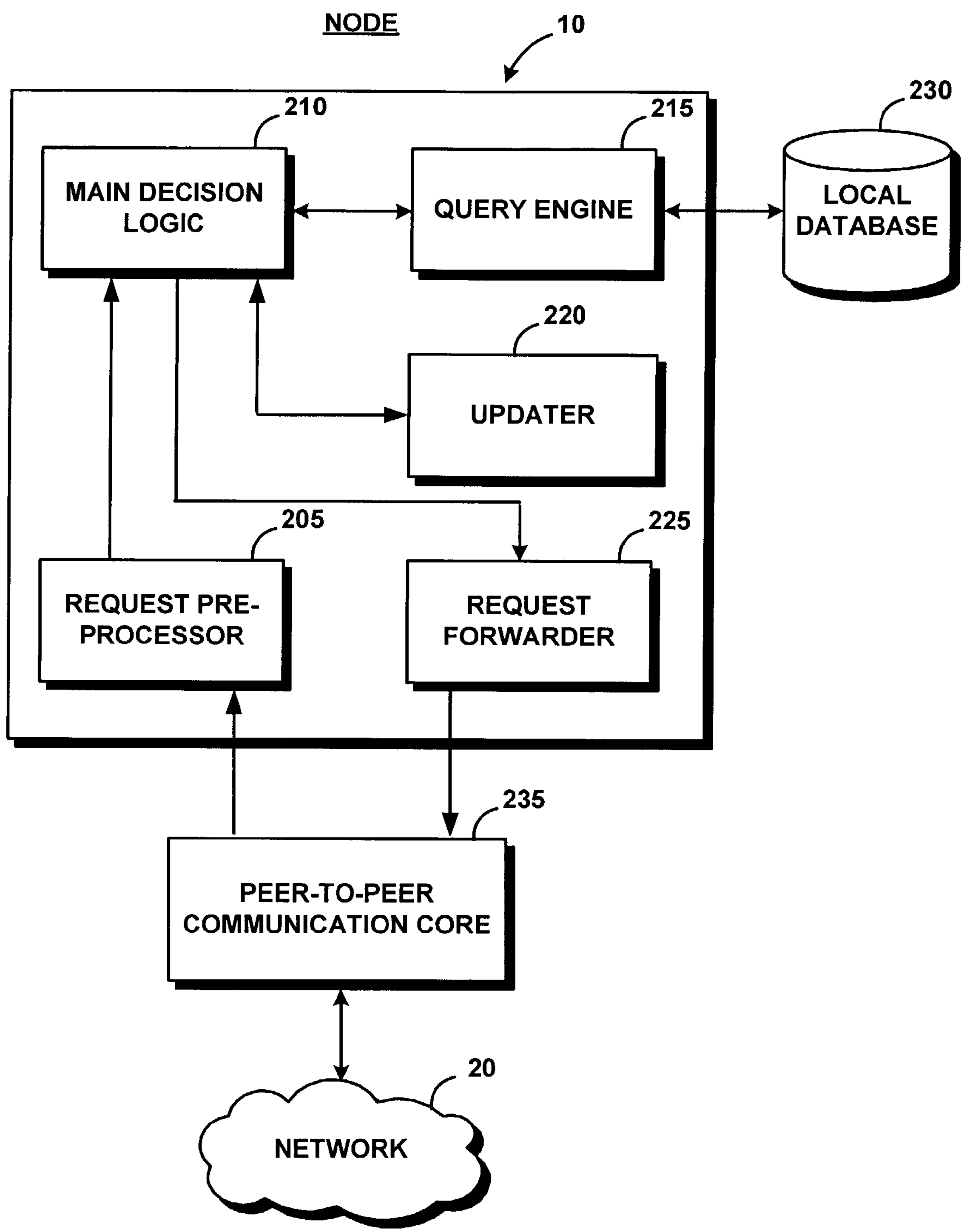
FIG. 2 is a block diagram of a high-level architecture of the distributed comparison shopping system of FIG. 1.

The high-level architecture for system 10 is shown in FIG. 2. System 10 generally comprises a request preprocessor 205, a main decision logic 210, a query engine 215, an updater 220, and a request forwarder 225. In addition, system 10 has access to a local database 230. System 10 connects to the peer-to-peer network 20 via a peer-to-peer communication core 235. The peer-to-peer communication core 235 could use known or available technology such as Gnutella, Freenet, or Sun Microsystems JXTA®.

Figure 3A:
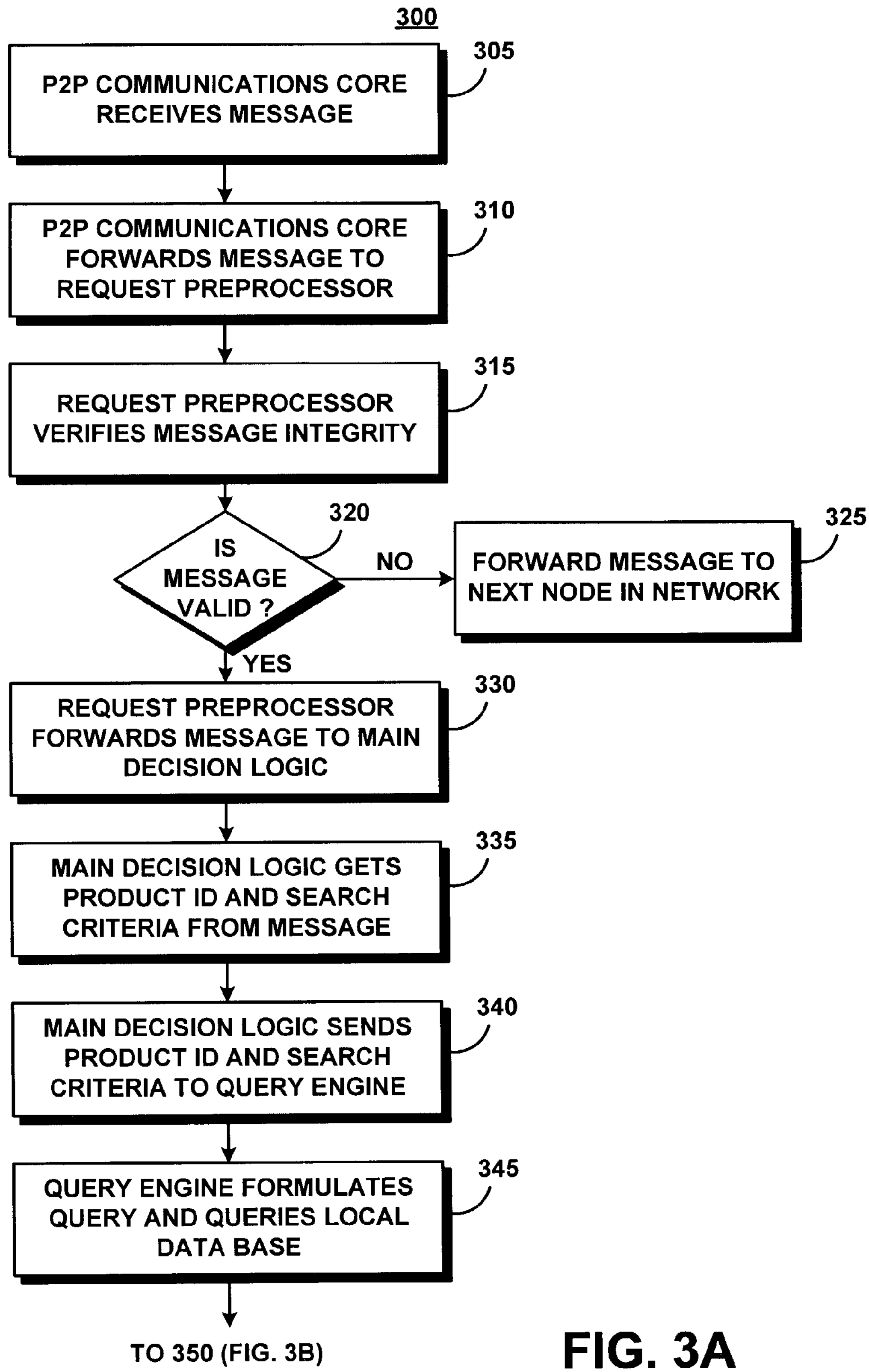
FIG. 3 is comprised of FIGS. 3A, 3B, and 3C, and represents a process flow chart illustrating a method of operation of the distributed comparison shopping system of FIGS. 1 and 2.
Figure 3B:
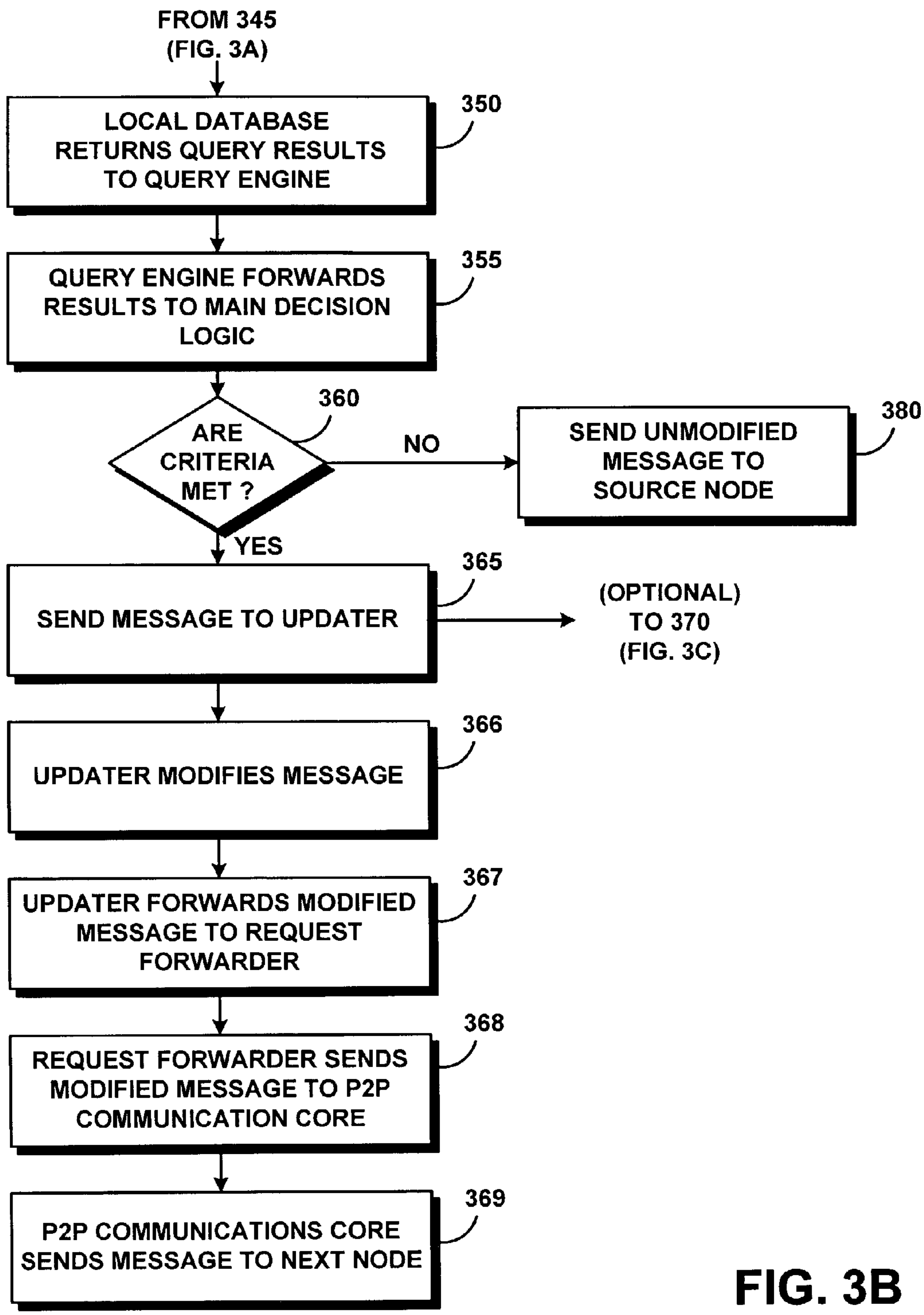
Figure 3C:
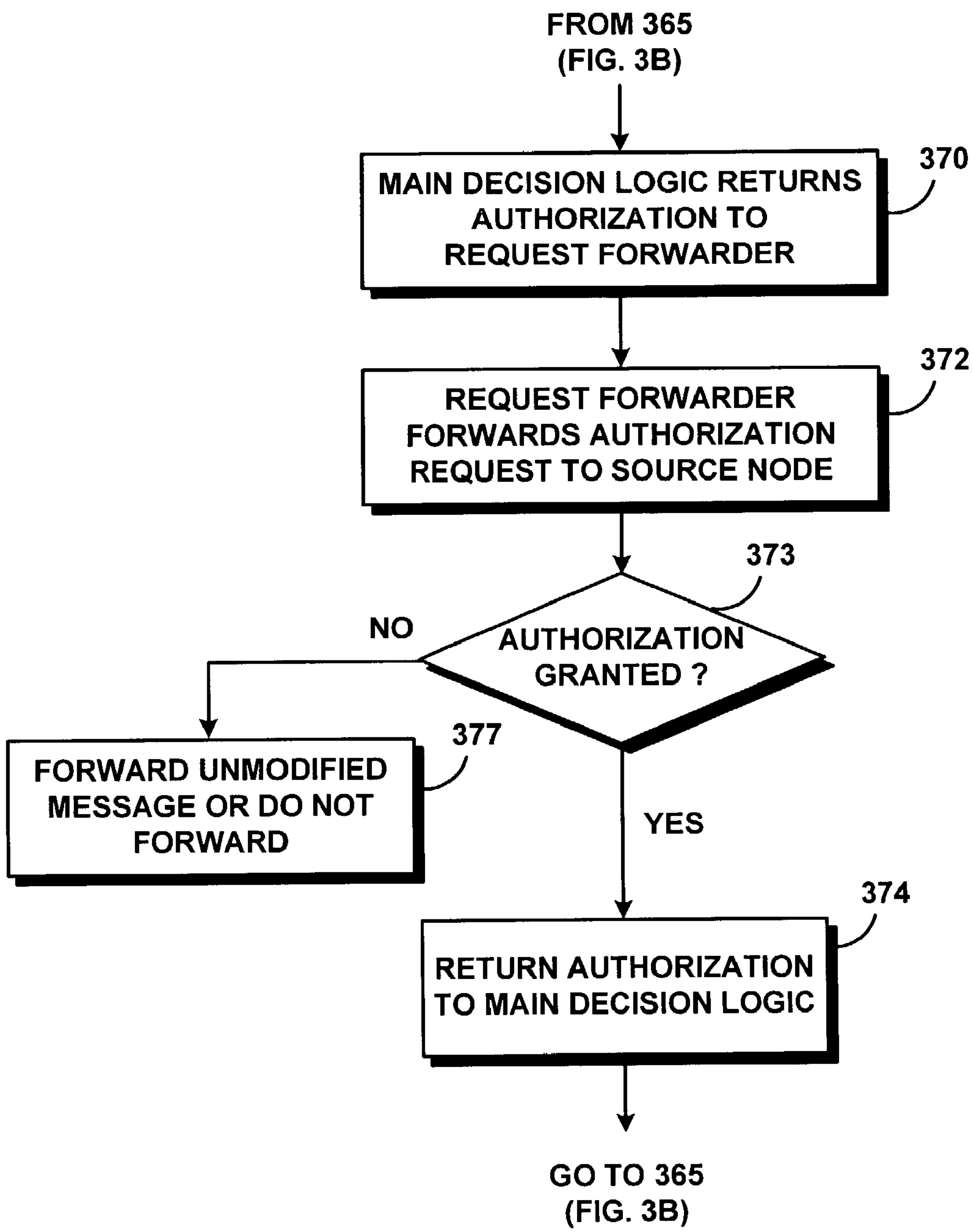
Figure 4:
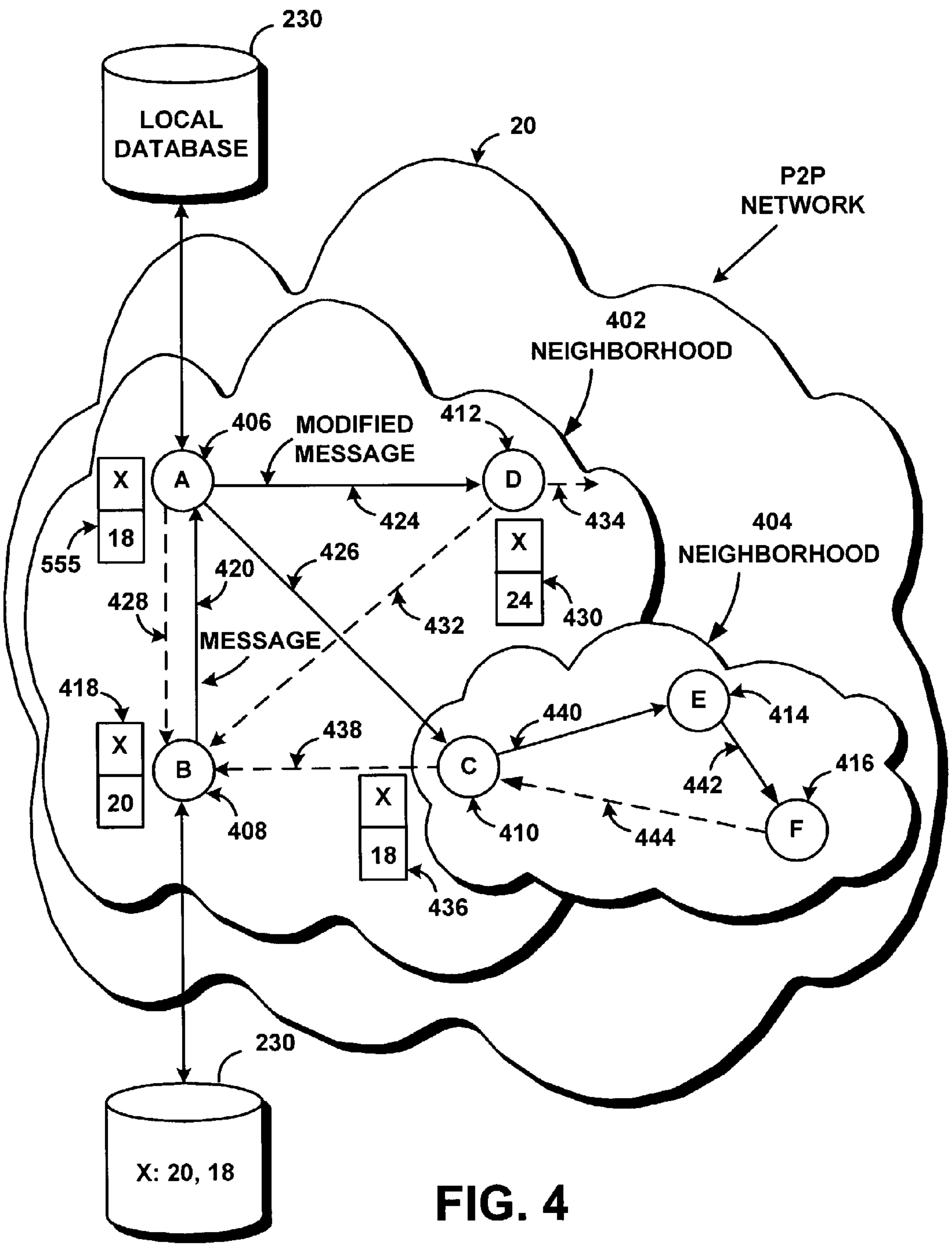
FIG. 4 is represents a schematic illustration of the operation of the distributed comparison shopping system of FIGS. 1 and 2 within a peer-to-peer network.

With further reference to FIG. 3 (FIGS. 3A, 3B, 3C), it illustrates a method of operation 300 of system 10 as implemented by a merchant's node (Node A, 406 in FIG. 4). The peer-to-peer (P2P) communication core 235 receives a message via the peer-to-peer network 20 at block 305, and forwards it to the request preprocessor 205 at block 310.

The request preprocessor 205 then verifies the integrity of the message at block 315 by, for example, validating the contents and the electronic signatures. If method 300 determines at decision block 320 that the message is invalid, system 10 forwards it to the next node in the network 20 (block 325). Otherwise, system 10 proceeds to block 330 and forwards the message to the main decision logic 210 at block 330.

The main decision logic 210 retrieves the subject ID (e.g., product and/or service identification) and search criteria from the message at block 335, then forwards the subject ID and search criteria to the query engine 215 at block 340. At block 345, the query engine 215 formulates the query using the subject ID and search criteria then queries the local database 230.

The local database 230 returns the query results back to the query engine 215 at block 350, which, in turn, forwards the query results to the main decision logic 210 at block 355. The main decision logic 210 compares the query results with the search criteria at decision block 360. If the search criteria are met, i.e., the merchant has the item and can meet the price presented in the message, the node A, 406 can take, for example, one of two actions, as determined by the user and set as instructions in the message.

According to a first embodiment (FIG. 3B), the main decision logic 210 forwards the results to the updater 220, at block 365. The updater 220 updates the search criteria and/or the search status within the message, resulting in a modified message, at block 366. The updater 220 forwards the modified message to the request forwarder 225 at block 367.

The request forwarder 225 sends the modified message to the peer-to-peer communication core 235 at block 368, which, in turn, forwards the modified message to the next node or nodes in the peer-to-peer network 20 at block 369. For example, the merchant responds to the buyer with a lower price or better shipping terms. This new information is encoded in the original search request, which reflects that the dynamically changing nature of the adaptive search.

According to another embodiment of the present invention (FIG. 3C), the main decision logic 210 forwards an authorization request to the request forwarder 225, at block 370. In turn, the request forwarder 225 forwards the authorization request back to the source or originating node, requesting confirmation or authorization to update the message, at block 372.

If method 300 determines at decision block 373 that the authorization request has been approved by the source node, such as if the source node returns the authorization to the main decision logic 210, via the request pre-processor 205, at block 374, method 300 proceeds to block 365 and repeats the steps at block 366, 367, 368, and 369, as described earlier, forwarding the updated message to the next node or nodes in the peer-to-peer network.

As an example, if the local found result is "better" in some aspect than the current criterion (or criteria), such as price, of the original message, the node contacts the originating node and sends a request to modify the original message. The modified message request contains, for example, the following information:

The message type (modified);

the original message the node received;

the condition on which the node is offering the product (price, shipping, etc.); and virtual or physical location/address of the product or service.

If, however, method 300 determines at decision block 373 that the source node did not grant the request authorization, the source node B, 408, sends an instruction to node A, 406, to either (1) send forward the unmodified message to succeeding nodes in the network 20, or (2) not to forward the message to any other node in the peer-to-peer network 20.

One function of the updater 220 is to negotiate a modified message from the search result and the original message. Three exemplary responses are possible. First, the merchant can provide the item for less than the current minimum. In which event, the main decision logic 210 instructs the updater 220 to modify the message and to replace the current minimum with the new minimum available from the merchant and to update the status field of the message.

Second, the merchant can provide the item for the same value as the current minimum. In which event, the main decision logic 210 instructs the updater 220 to update the status part of the message.

Third, the merchant can not match or beat the price value in the message, but can match one or more other criteria in the message, such as the shipping time, etc. In which event, the main decision logic 210 may instruct the updater 220 to modify the search criteria portion of the message, resulting in a modified message.

Returning now to FIG. 3B, if method 300 determines at decision block 360 that the search criteria are not met, i.e., the merchant does not have the product requested, then the original message is sent unmodified to the request forwarder 225 at block 380. The request forwarder 225 then forwards the unmodified (or original) message to succeeding nodes. Optionally, the node A, 406, could modify the search status field of the message and forwards the updated information to the succeeding nodes in the neighborhood.

Figure 5:
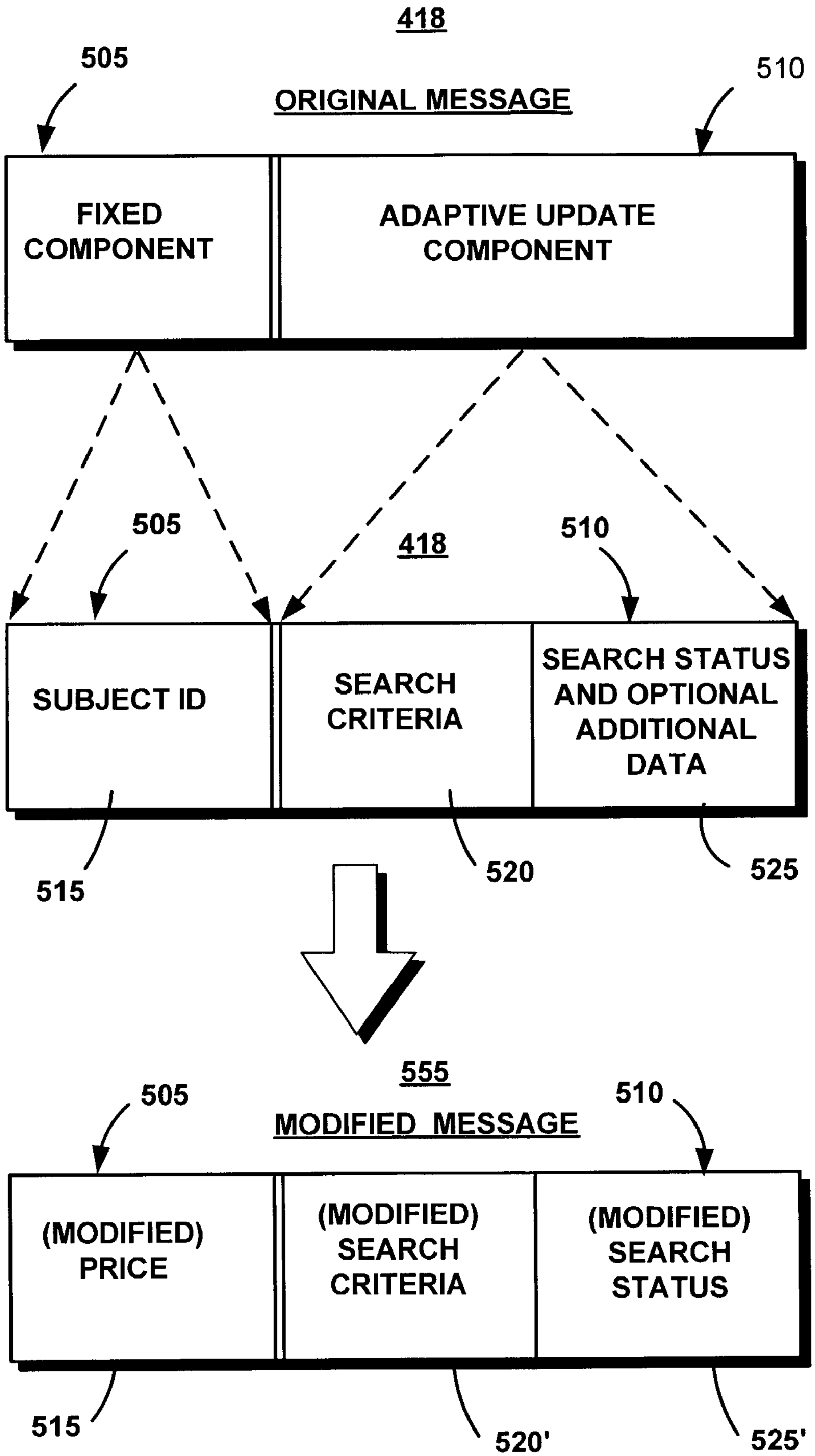
FIG. 5 is a block diagram representation of an original message as modified by the system of FIG. 4.

An example that further illustrates the operation of system 10 is illustrated by FIGS. 4 and 5. The various nodes in FIG. 4 preferably have the same or similar design and operation using system 10. The peer-to-peer network 20 includes many neighborhoods such as neighborhood 402 and neighborhood 404. Each neighborhood 402, 404, contains clusters of peers or nodes within the peer-to-peer network 20. In this illustration, node A, 406, node B 408, node C, 410, and node D, 412, are in neighborhood 402. Node C, 410, is also in neighborhood 404 along with node E, 414, and node F, 416.

In this example, node B 408 is the source node, and wishes to request quotes for an item (represented by the letter "X") such as a book, and sets the price limit for that book at $20. System 10 creates the request as a structured query, shown as original message 418.

Message 418 and subsequent modified (or updated) messages preferably comprise two components: a fixed component 505 and an adaptive update component 510. In turn, the fixed component 505 comprises a subject identification (ID) 515, which is comprised of a product or service identification, encoded in XML.

The adaptive update component 510 comprises a search criteria field (or fields) 520, encoded in Boolean Expression query language, and a search status field 525 that contains metadata collected as the message travels throughout the peer-to-peer network 20.

The product or service identification may be very specific; i.e., "book; ISBN #1123413". Exemplary search criteria include price limits and delivery date limits. Message 418 comprises the structured message "X" and the criteria limit "20". The search status field 525 monitors the number of modifications the message receives, and includes values such as number of nodes traveled by the message, time stamp, etc.

The search status field 525 is a bookkeeping value, and is not part of the search criteria. However, the search criteria 520 of the message can be formulated to include the search status. For example, the user at node B, 408, may limit the travel time of message 418 through the network 20 to a few hours, such as 4 hours. In which case, system 10 (at each node) will not rebroadcast the message after the time limit expires.

System 10 at node A, 406, determines whether the merchant at node A, 406 has the product that the source node B, 408, is requesting by querying a local database 230 (or any other suitable database to which node A has access) at node A, 406 (block 345). If the merchant at node A, 406, has the product, system 10 at node A, 406, determines whether the search criteria goal of message 418 can be met. If not, node A, 406, forwards message 418 to one or more nodes in neighborhood 402. If node A, 406, can satisfy the criteria of message 418, node A, 406, modifies the search criteria 515 and/or the search status 525, as described earlier, resulting in modified message 555 that contains a modified search criteria component 520' and/or a modified search status component 525'.

A feature of system 10 is the ability to change the criteria goal of message 418 to reflect the new criteria 520. For example, the price of node A, 406, for the product requested by node B, 408, is $18. System 10 at node A, 406, changes the price criteria of message 418, to $18, as shown by the modified message 555. Node A, 406, then broadcasts (or rebroadcasts) the modified message 555 to node D, 412, via path 424, node C, 410, via path 426, and back to node B, 408, via path 428.

Node D, 412, searches its local database for the product and price in modified message 555. Node D, 412, finds that it has the product, but the price is $24. However, the merchant at node D, 412, may be able to match or beat some other criteria such as shipping time or shipping cost. Node D, 412, then changes the modified message 555, creating another modified message 430. Node D, 412 returns the modified message 430 to node B, 408, via path 432 and forwards modified message 430 to other nodes in its neighborhood, as indicated by path 434.

Node C, 410, also searches its local database for the product and price in modified message 555. The merchant at node C, 410, can match the price in modified message 555. Node C, 410, then sends a modified message 436 to node B, 408, via path 438, matching the search criteria of the modified message 555. Node C, 410, also sends the modified message 436 to node E, 414, via path 440 in neighborhood 404.

Node E, 414, forwards the modified message 436 to node F, 416, via path 442. Node F, 416, can route a response back to node B, 408, through node C, 410, via path 444 and path 438 if the merchant at node F, 416, can meet the criteria of modified message 436.

Node B, 408, is waiting for incoming search results. These incoming messages could take one of three modified message forms. First, the originator of the modified message may offer the product for more than the current minimum (node D, 412). Node B, 408, would update the search status component 525 of the modified message and replace it with the current minimum, then return the modified message to the originator of the modified message.

Second, the originator of the modified message offers the product for the same price as the current message (i.e. node C, 410). Node B, 408, would update the status part of the incoming message and replace it with the current minimum. Node B, 408, would then add the merchant at that node (node C, 410) to the response list in the local database 230 at node B, 408.

Third, the originator of the modified message offers the product for less than the current minimum (node A, 406). Node B, 408 updates the search status component of the obtained message, replaces it with the current minimum, and adds the seller to the list in the local database 230 at node B, 408.

The user at node B 408 now has quotes from two merchants stored in the local database 230: the merchant at node A, 406, for $18 and the merchant at node C, 410, for $18. In addition, the original message 418 is stored in the local database for reference to incoming quotes. The user may now select either offer by using the URL included in the message to contact the merchant.

In another embodiment, node C, 410, does not change the message but matches the search criteria. According to one embodiment, node C, 410, sends an authorization request to modify the message, informing node B 408 that node C 410 can offer the best price for the item. Node B 408 then decides whether or not to accept node B's offer, as explained earlier.

The user at node B, 408, may investigate the credibility of the merchant at node C, 410, and find that the merchant at node C, 410, has a reputation for poor service or unethical business practices, etc. The user at node B, 408, may then refuse to allow node C, 410, to update the message. Otherwise, the user at node B 408 chooses to update the message from the merchant at node C, 410, and returns the appropriate authorization to node C, 410.

It is to be understood that the specific embodiments of the invention that have been described are merely illustrative of certain application of the principle of the present invention. Numerous modifications may be made to the system and method for modifying a peer-to-peer network to accommodate distributed comparison shopping invention described herein without departing from the spirit and scope of the present invention.

What is claimed is:

1. A method of conducting an adaptive search using a peer-to-peer network, to provide competitive sales terms for any of a product or a service, comprising:

a source node transmitting an original message to a first receiving node in the peer-to-peer network, requesting the competitive sales terms of the first receiving node;

wherein the original message contains a criterion set by the source node;

wherein the criterion contains a fixed component and an adaptive update component;

wherein if the criterion is met by the first receiving node, the first receiving node modifying the adaptive update component of the original message to include the competitive sales terms of the first receiving node, and generating a corresponding modified message;

wherein the fixed component of the criterion is set by the source node and remains invariable as the original message and the corresponding modified message are broadcast through the peer-to-peer network;

broadcasting the modified message, including the competitive sales terms of the first receiving node, to at least a second receiving node in the peer-to-peer network, requesting the competitive sales terms of the at least second receiving node;

wherein if the criterion is met by the at least second receiving node, the at least second receiving node modifying the adaptive update component of the modified message to include the competitive sales terms of the at least second receiving node, and generating a corresponding modified message, thus automatically securing favorable negotiation terms for any of the product or service.

2. The method of claim 1, further comprising returning the modified message to the source node.

3. The method of claim 1, wherein the fixed component contains a subject identification.

4. The method of claim 3, wherein the subject identification identifies a product.

5. The method of claim 3, wherein the subject identification identifies a service.

6. The method of claim 1, wherein the adaptive update component contains a search criteria field that defines the criterion set by the source node.

7. The method of claim 1, wherein the adaptive update component contains a search status field.

8. The method of claim 6, wherein modifying the original message comprises modifying the search criteria field.

9. The method of claim 7, wherein modifying the original message comprises modifying the search status field.

10. The method of claim 6, wherein the adaptive update component contains a search status field; and wherein modifying the original message comprises modifying the search status field.

11. The method of claim 1, wherein if the criterion is not met by the first receiving node, the first receiving node broadcasting the original message, unmodified, to the at least second receiving node.

12. The method of claim 10, wherein if the criterion is not met by the first receiving node, the first receiving node modifying the search status field and broadcasting the modified message to the at least second receiving node.

13. The method of claim 1, wherein if the criterion is not met by the first receiving node, the first receiving node broadcasting the original message, unmodified, to the at least second receiving node.

14. The method of claim 1, wherein if the criterion is met, and favorable negotiation terms for any of the product or service are offered by the first receiving node, the first receiving node requesting authorization to modify the message from the source node, prior to broadcasting to the at least second receiving node.

15. The method of claim 14, wherein if the source node returns an authorization to modify to the first receiving node, the first receiving node modifying the criterion and modifying the original message into the modified message.

16. The method of claim 14, wherein if the source node does not grant an authorization to modify to the first receiving node, the first receiving node does not modify the original message, and broadcast the original message with the criterion unmodified.

17. The method of claim 1, further comprising the at least second receiving node further modifying the modified message into a remodified message.

18. The method of claim 17, further comprising the at least second receiving node rebroadcasting the remodified message to at least a third receiving node in the peer-to-peer network.

19. A system for conducting an adaptive search using a peer-to-peer network, to provide competitive sales terms for any of a product or a service, comprising:

a source node that transmits an original message to a first receiving node in the peer-to-peer network, requesting the competitive sales terms of the first receiving node;

wherein the original message contains a criterion set by the source node;

wherein the criterion contains a fixed component and an adaptive update component;

wherein if the criterion is met by the first receiving node, the first receiving node modifying the adaptive update component of the original message to include the competitive sales terms of the first receiving node, and generating a corresponding modified message;

wherein the fixed component of the criterion is set by the source node and remains invariable as the original message and the corresponding modified message are broadcast through the peer-to-peer network;

the first broadcasting node broadcasting the modified message, including the competitive sales terms of the first receiving node, to at least a second receiving node in the peer-to-peer network, requesting the competitive sales terms of the at least second receiving node;

wherein if the criterion is met by the at least second receiving node, the at least second receiving node modifying the adaptive update component of the modified message to include the competitive sales terms of the at least second receiving node, and generating a corresponding modified message, thus automatically securing favorable negotiation terms for any of the product or service.

20. The system of claim 19, further comprising the first receiving node returns the modified message to the source node.

21. The system of claim 19, wherein the fixed component contains a subject identification.

22. The system of claim 21, wherein the adaptive update component contains a search criteria field that defines a price associated with the subject identification.

23. The system of claim 22, wherein the adaptive update component contains a search status field.

24. The system of claim 19, wherein if the criterion is not met by the first receiving node, the first receiving node broadcasts the original message, unmodified, to the at least second receiving node.

25. The system of claim 24, wherein if the criterion is not met by the first receiving node, the first receiving node modifies the original message and broadcasts the modified message to the at least second receiving node.

26. The system of claim 19, wherein if the criterion is met, and favorable negotiation terms for any of the product or service are offered by the first receiving node, the first receiving node requests authorization to modify the message from the source node, prior to broadcasting to the at least second receiving node.

27. A computer program product having a plurality of executable instruction codes that are stored on a computer-readable medium, for conducting an adaptive search using a peer-to-peer network, to provide competitive sales terms for any of a product or a service, comprising:

a source node that transmits an original message to a first receiving node in the peer-to-peer network, requesting the competitive sales terms of the first receiving node;

wherein the original message contains a criterion set by the source node;

wherein the criterion contains a fixed component and an adaptive update component;

wherein if the criterion is met by the first receiving node, the first receiving node modifies the adaptive update component of the original message to include the competitive sales terms of the first receiving node, and generating a corresponding modified message;

wherein the fixed component of the criterion is set by the source node and remains invariable as the original message and the corresponding modified message are broadcast through the peer-to-peer network;

the first broadcasting node broadcasts the modified message, including the competitive sales terms of the first receiving node, to at least a second receiving node in the peer-to-peer network, requesting the competitive sales terms of the at least second receiving node;

wherein if the criterion is met by the at least second receiving node, the at least second receiving node modifying the adaptive update component of the modified message to include the competitive sales terms of the at least second receiving node, and generating a corresponding modified message, thus automatically securing favorable negotiation terms for any of the product or service.

28. The computer program product of claim 27, further comprising the first receiving node returns the modified message to the source node.

29. The computer program product of claim 27, wherein the fixed component contains a subject identification.

30. The computer program product of claim 29, wherein the adaptive update component contains a search criteria field that defines a price associated with the subject identification.

31. The computer program product of claim 30, wherein the adaptive update component contains a search status field.

32. The computer program product of claim 27, wherein if the criterion is not met by the first receiving node, the first receiving node broadcasts the original message, unmodified, to the at least second receiving node.

33. The computer program product of claim 32, wherein if the criterion is not met by the first receiving node, the first receiving node modifies the original message and broadcasts the modified message to the at least second receiving node.

34. The computer program product of claim 27, wherein if the criterion is met, and favorable negotiation terms for any of the product or service are offered by the first receiving node, the first receiving node requests authorization to modify the message from the source node, prior to broadcasting to the at least second receiving node.

* * * * *